US012627982B2

(12) United States Patent
Rule et al.

(10) Patent No.: US 12,627,982 B2
(45) Date of Patent: May 12, 2026

(54) SYSTEMS AND METHODS OF REDUCING FRAUD FOR SMS OTP AUTHENTICATION

(71) Applicant: Capital One Services, LLC, McLean, VA (US)

(72) Inventors: Jeffrey Rule, Chevy Chase, MD (US); Lawrence Douglas, McLean, VA (US); Jackson Macomber, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 385 days.

(21) Appl. No.: 18/223,617

(22) Filed: Jul. 19, 2023

(65) Prior Publication Data

US 2025/0031045 A1     Jan. 23, 2025

(51) Int. Cl.
| | |
|---|---|
| *G06F 21/32* | (2013.01) |
| *H04W 8/20* | (2009.01) |
| *H04W 12/06* | (2021.01) |
| *H04W 12/12* | (2021.01) |

(52) U.S. Cl.
CPC ............. *H04W 12/12* (2013.01); *H04W 8/20* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 8,387,141 B1 | 2/2013 | Zhukov et al. | |
| 9,374,369 B2 | 6/2016 | Mahaffey et al. | |

| | | | |
|---|---|---|---|
| 9,854,444 B2 | 12/2017 | Wan et al. | |
| 10,218,839 B2 | 2/2019 | Gupta et al. | |
| 10,630,669 B2 | 4/2020 | Matute | |
| 11,134,071 B2 | 9/2021 | Kumar et al. | |
| 11,374,927 B1 | 6/2022 | Kaditz et al. | |
| 11,601,807 B2 | 3/2023 | Masure et al. | |

(Continued)

FOREIGN PATENT DOCUMENTS

| | | |
|---|---|---|
| CN | 110708414 A | 1/2020 |
| EP | 1 710 980 B1 | 8/2012 |
| EP | 2826004 B1 | 9/2020 |

OTHER PUBLICATIONS

The International Search Report and Written Opinion mailed Nov. 8, 2024 for Int. App. No. PCT/US24/38505 (38 pages).

*Primary Examiner* — Gary Lafontant
(74) *Attorney, Agent, or Firm* — KDW Firm PLLC; Andrew D. Kasnevich

(57) ABSTRACT

A method for reducing fraud for SMS OTP authentication includes receiving, by a server from a plurality of participating entities, a plurality of phone numbers and a plurality of metadata associated with a user, and determining, by the server, a phone number tenure for each of the plurality of phone numbers, based on the plurality of metadata. The method further includes determining, by the server, a phone number consistency for the plurality of phone numbers, based on the plurality of metadata, and determining, by the server, a device binding status for each of the plurality of phone numbers, based on the plurality of metadata. The method further includes determining, by the server, a most reliable phone number associated with the user from the plurality of phone numbers, and transmitting, by the server, to the most reliable phone number a SMS OTP, and authenticating the user based on the SMS OTP.

20 Claims, 8 Drawing Sheets

(56) References Cited

U.S. PATENT DOCUMENTS

| 2016/0117673 | A1 | 4/2016 | Landrok et al. |
| 2018/0247312 | A1 | 8/2018 | Loganathan et al. |
| 2019/0182192 | A1 | 6/2019 | Talwar et al. |
| 2022/0078184 | A1 | 3/2022 | Traynor et al. |
| 2022/0272158 | A1 | 8/2022 | Naujok |
| 2023/0259602 | A1* | 8/2023 | Anwar ................. H04L 9/3231 |
| | | | 713/186 |

* cited by examiner

100

200

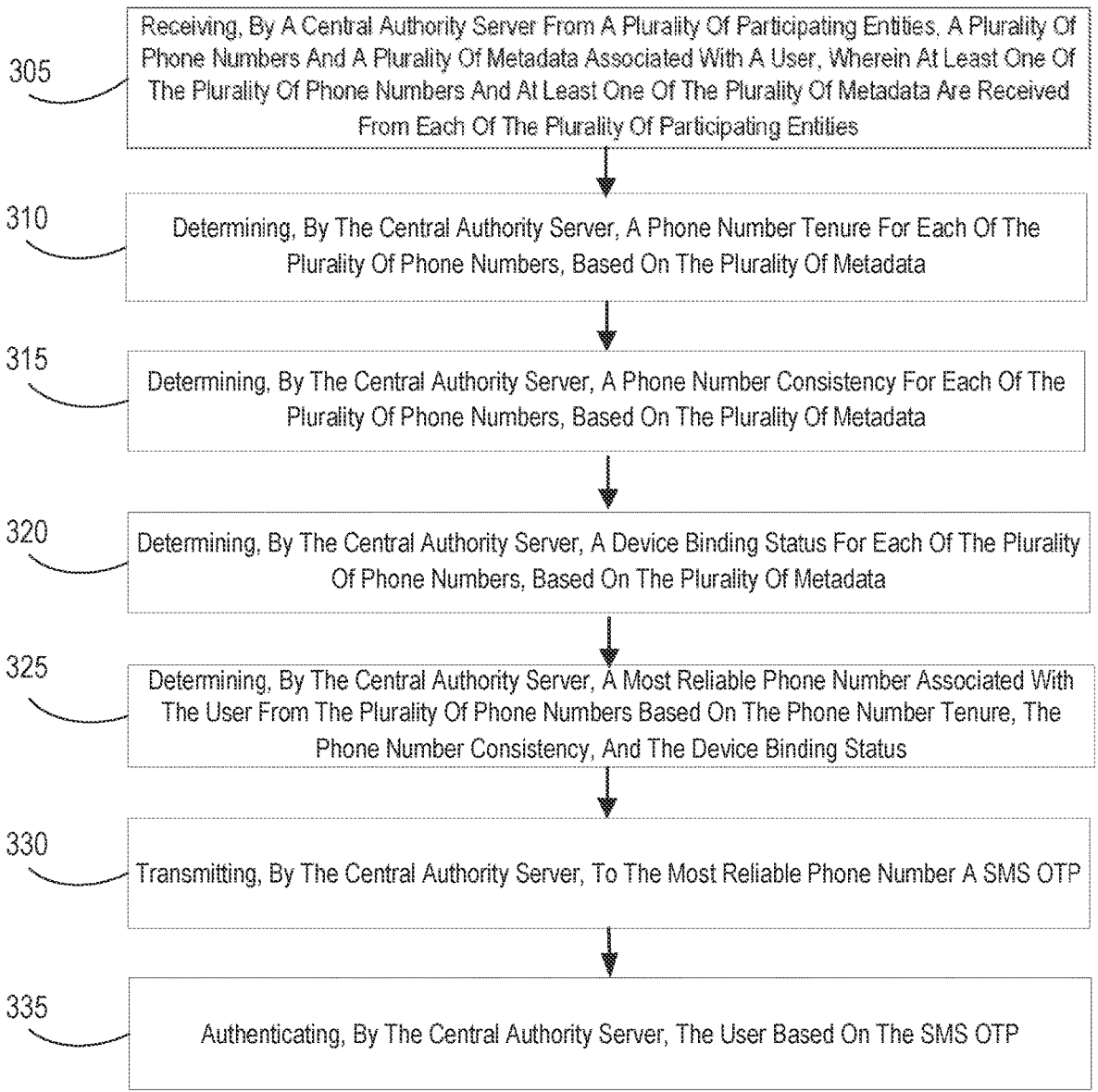

305  Receiving, By A Central Authority Server From A Plurality Of Participating Entities, A Plurality Of Phone Numbers And A Plurality Of Metadata Associated With A User, Wherein At Least One Of The Plurality Of Phone Numbers And At Least One Of The Plurality Of Metadata Are Received From Each Of The Plurality Of Participating Entities 310  Determining, By The Central Authority Server, A Phone Number Tenure For Each Of The Plurality Of Phone Numbers, Based On The Plurality Of Metadata 315  Determining, By The Central Authority Server, A Phone Number Consistency For Each Of The Plurality Of Phone Numbers, Based On The Plurality Of Metadata 320  Determining, By The Central Authority Server, A Device Binding Status For Each Of The Plurality Of Phone Numbers, Based On The Plurality Of Metadata 325  Determining, By The Central Authority Server, A Most Reliable Phone Number Associated With The User From The Plurality Of Phone Numbers Based On The Phone Number Tenure, The Phone Number Consistency, And The Device Binding Status 330  Transmitting, By The Central Authority Server, To The Most Reliable Phone Number A SMS OTP 335  Authenticating, By The Central Authority Server, The User Based On The SMS OTP

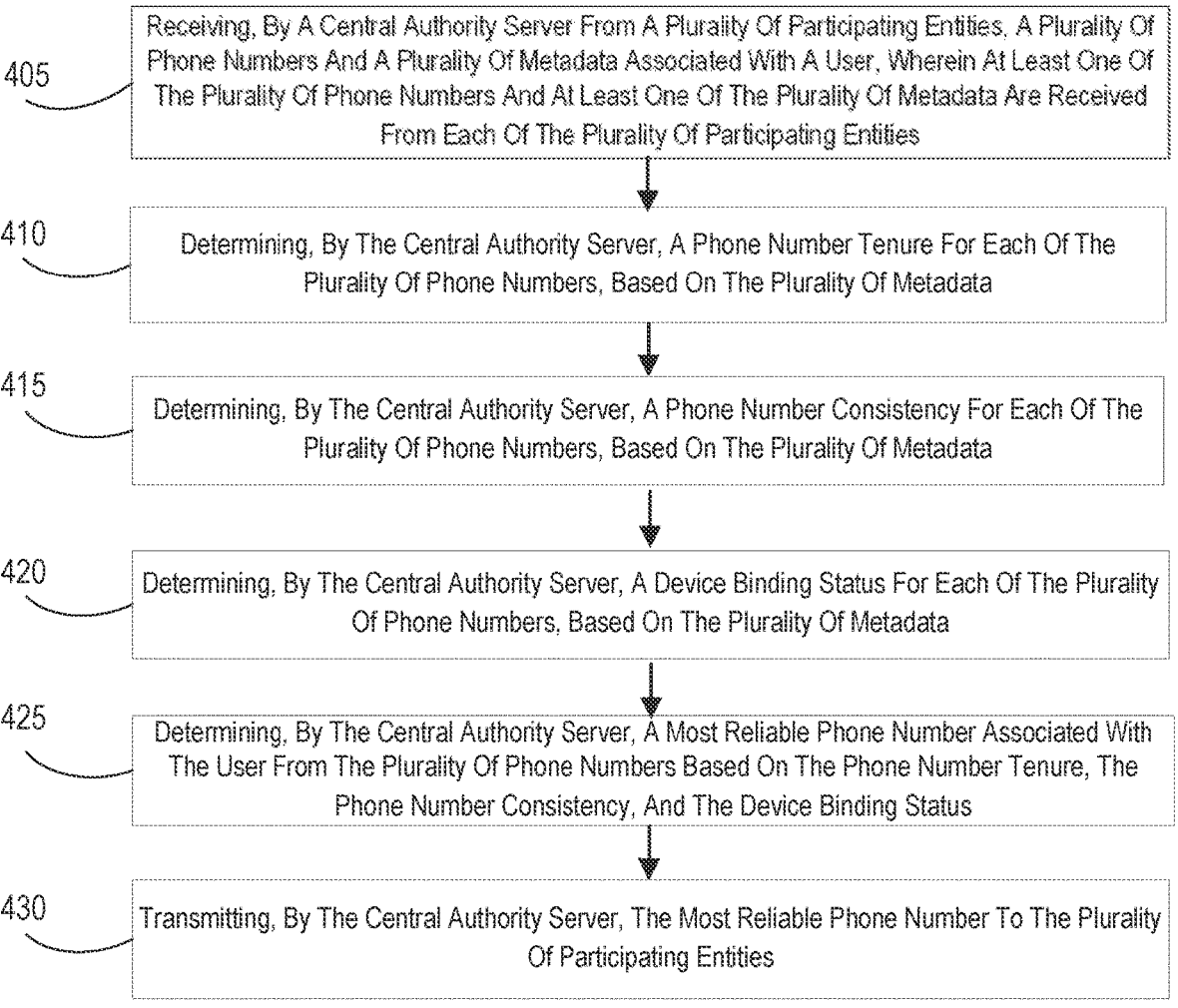

405 — Receiving, By A Central Authority Server From A Plurality Of Participating Entities, A Plurality Of Phone Numbers And A Plurality Of Metadata Associated With A User, Wherein At Least One Of The Plurality Of Phone Numbers And At Least One Of The Plurality Of Metadata Are Received From Each Of The Plurality Of Participating Entities 410 — Determining, By The Central Authority Server, A Phone Number Tenure For Each Of The Plurality Of Phone Numbers, Based On The Plurality Of Metadata 415 — Determining, By The Central Authority Server, A Phone Number Consistency For Each Of The Plurality Of Phone Numbers, Based On The Plurality Of Metadata 420 — Determining, By The Central Authority Server, A Device Binding Status For Each Of The Plurality Of Phone Numbers, Based On The Plurality Of Metadata 425 — Determining, By The Central Authority Server, A Most Reliable Phone Number Associated With The User From The Plurality Of Phone Numbers Based On The Phone Number Tenure, The Phone Number Consistency, And The Device Binding Status 430 — Transmitting, By The Central Authority Server, The Most Reliable Phone Number To The Plurality Of Participating Entities

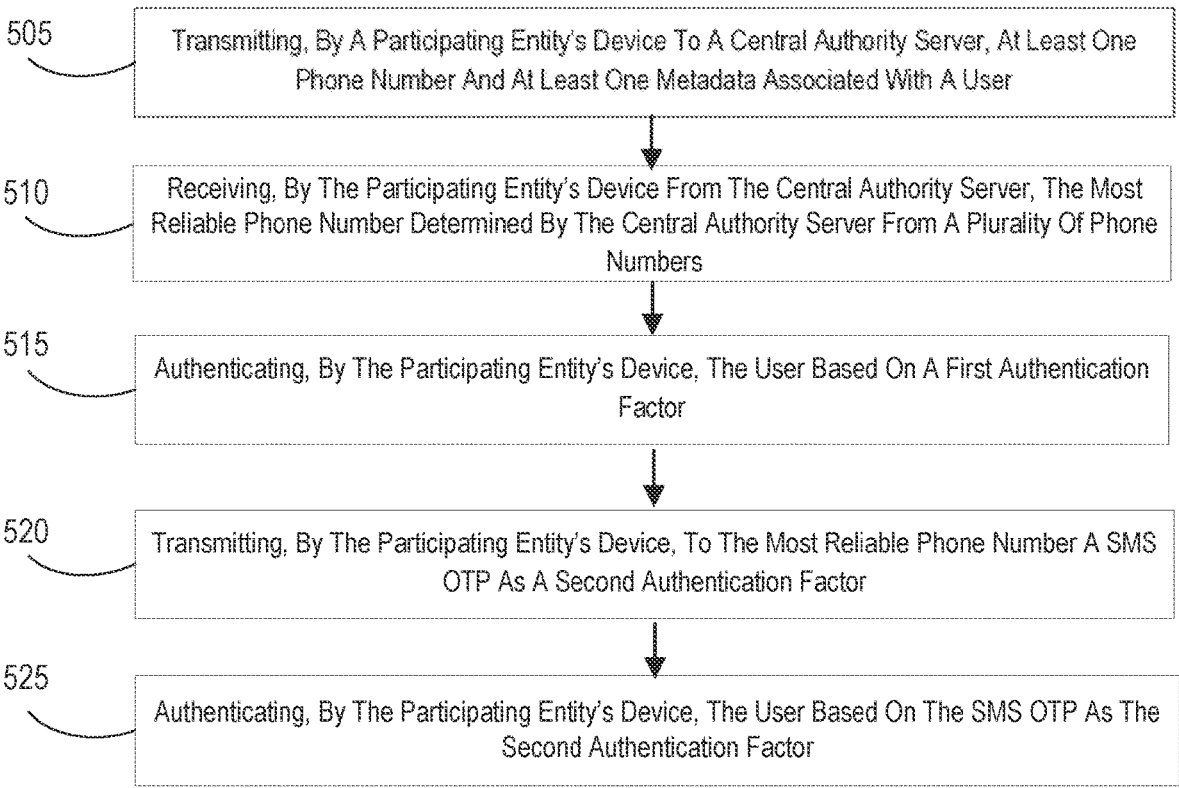

505  Transmitting, By A Participating Entity's Device To A Central Authority Server, At Least One Phone Number And At Least One Metadata Associated With A User 510  Receiving, By The Participating Entity's Device From The Central Authority Server, The Most Reliable Phone Number Determined By The Central Authority Server From A Plurality Of Phone Numbers 515  Authenticating, By The Participating Entity's Device, The User Based On A First Authentication Factor 520  Transmitting, By The Participating Entity's Device, To The Most Reliable Phone Number A SMS OTP As A Second Authentication Factor 525  Authenticating, By The Participating Entity's Device, The User Based On The SMS OTP As The Second Authentication Factor

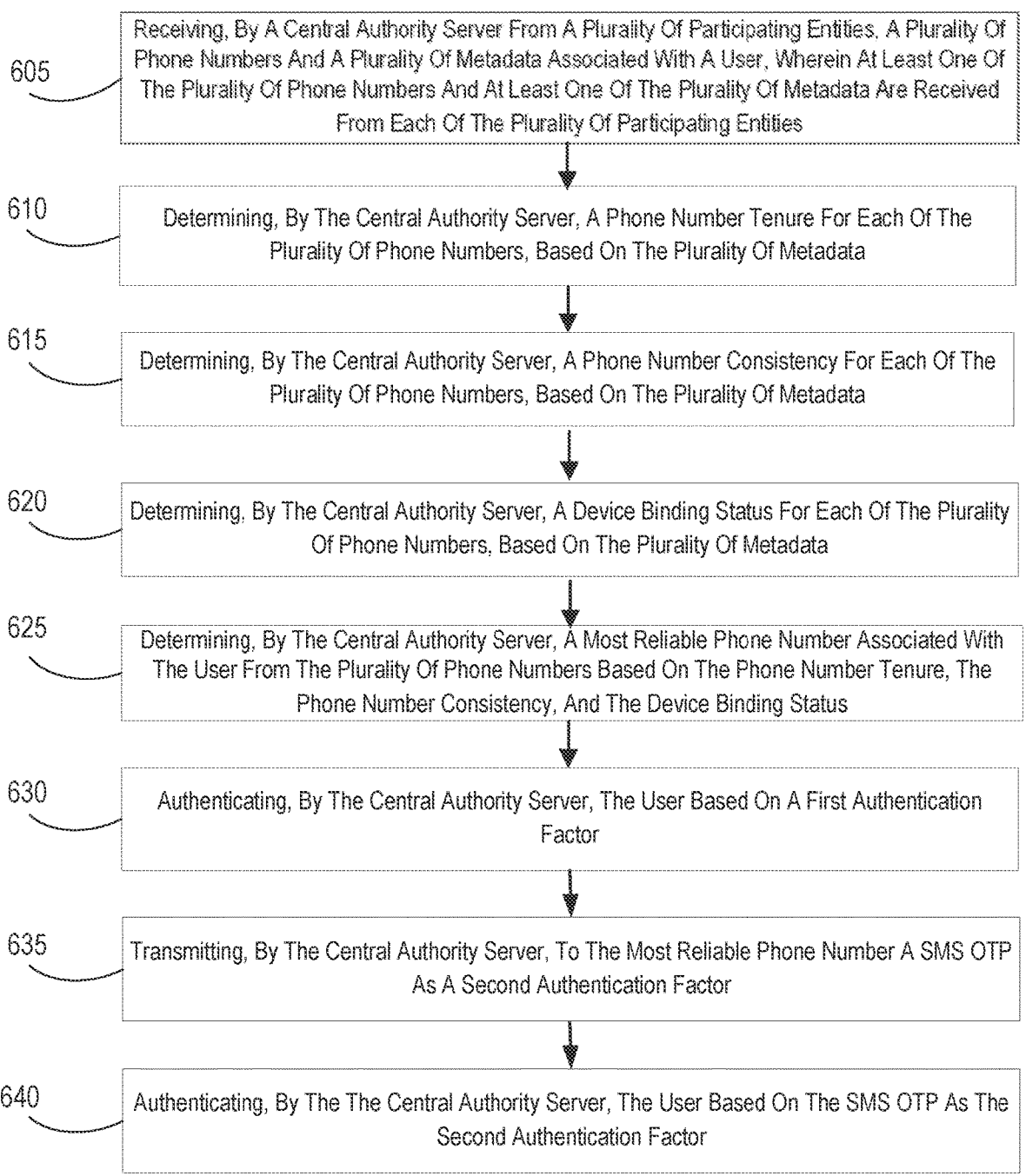

605 Receiving, By A Central Authority Server From A Plurality Of Participating Entities, A Plurality Of Phone Numbers And A Plurality Of Metadata Associated With A User, Wherein At Least One Of The Plurality Of Phone Numbers And At Least One Of The Plurality Of Metadata Are Received From Each Of The Plurality Of Participating Entities 610 Determining, By The Central Authority Server, A Phone Number Tenure For Each Of The Plurality Of Phone Numbers, Based On The Plurality Of Metadata 615 Determining, By The Central Authority Server, A Phone Number Consistency For Each Of The Plurality Of Phone Numbers, Based On The Plurality Of Metadata 620 Determining, By The Central Authority Server, A Device Binding Status For Each Of The Plurality Of Phone Numbers, Based On The Plurality Of Metadata 625 Determining, By The Central Authority Server, A Most Reliable Phone Number Associated With The User From The Plurality Of Phone Numbers Based On The Phone Number Tenure, The Phone Number Consistency, And The Device Binding Status 630 Authenticating, By The Central Authority Server, The User Based On A First Authentication Factor 635 Transmitting, By The Central Authority Server, To The Most Reliable Phone Number A SMS OTP As A Second Authentication Factor 640 Authenticating, By The The Central Authority Server, The User Based On The SMS OTP As The Second Authentication Factor

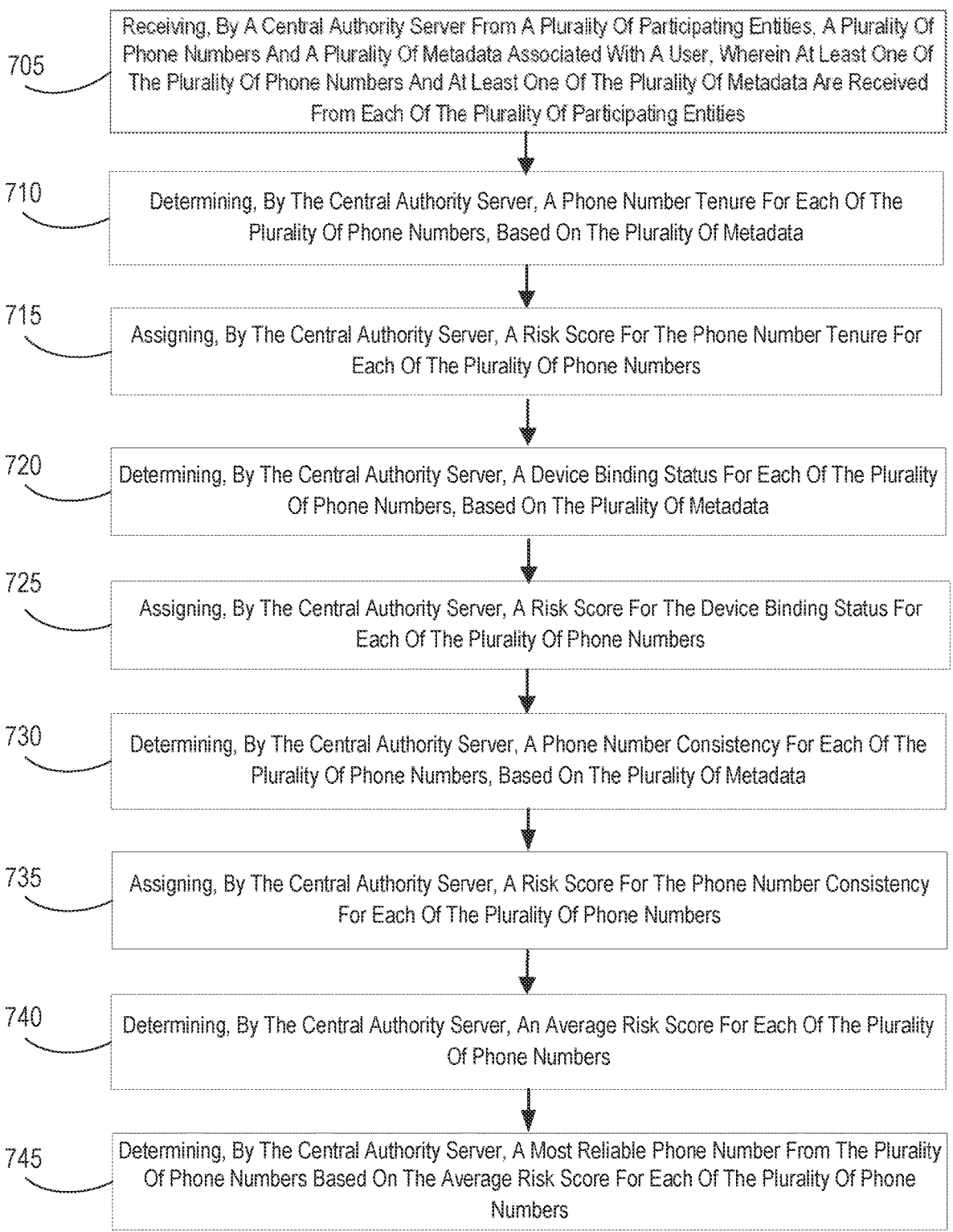

705 Receiving, By A Central Authority Server From A Plurality Of Participating Entities, A Plurality Of Phone Numbers And A Plurality Of Metadata Associated With A User, Wherein At Least One Of The Plurality Of Phone Numbers And At Least One Of The Plurality Of Metadata Are Received From Each Of The Plurality Of Participating Entities 710 Determining, By The Central Authority Server, A Phone Number Tenure For Each Of The Plurality Of Phone Numbers, Based On The Plurality Of Metadata 715 Assigning, By The Central Authority Server, A Risk Score For The Phone Number Tenure For Each Of The Plurality Of Phone Numbers 720 Determining, By The Central Authority Server, A Device Binding Status For Each Of The Plurality Of Phone Numbers, Based On The Plurality Of Metadata 725 Assigning, By The Central Authority Server, A Risk Score For The Device Binding Status For Each Of The Plurality Of Phone Numbers 730 Determining, By The Central Authority Server, A Phone Number Consistency For Each Of The Plurality Of Phone Numbers, Based On The Plurality Of Metadata 735 Assigning, By The Central Authority Server, A Risk Score For The Phone Number Consistency For Each Of The Plurality Of Phone Numbers 740 Determining, By The Central Authority Server, An Average Risk Score For Each Of The Plurality Of Phone Numbers 745 Determining, By The Central Authority Server, A Most Reliable Phone Number From The Plurality Of Phone Numbers Based On The Average Risk Score For Each Of The Plurality Of Phone Numbers

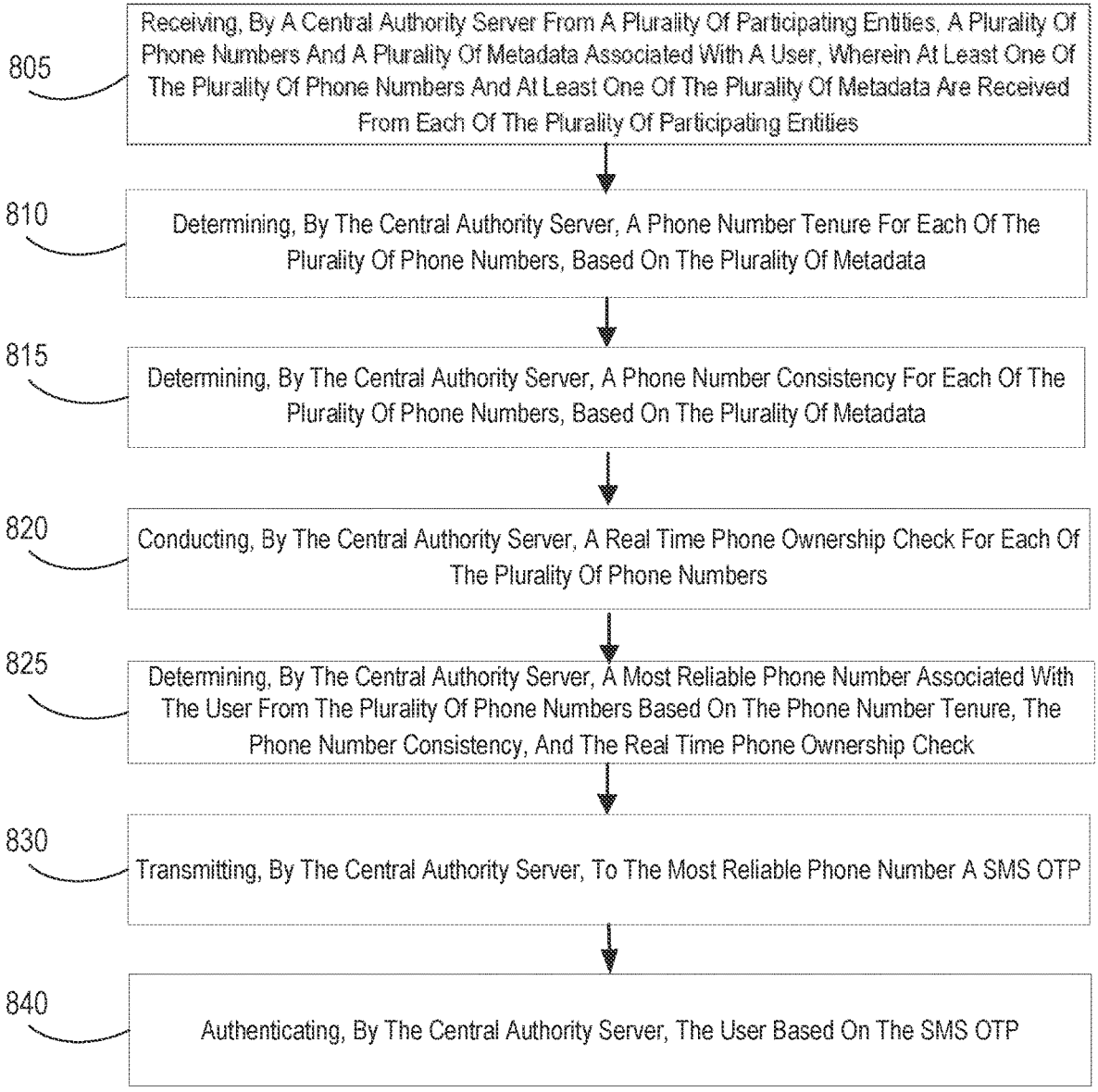

805 Receiving, By A Central Authority Server From A Plurality Of Participating Entities, A Plurality Of Phone Numbers And A Plurality Of Metadata Associated With A User, Wherein At Least One Of The Plurality Of Phone Numbers And At Least One Of The Plurality Of Metadata Are Received From Each Of The Plurality Of Participating Entities 810 Determining, By The Central Authority Server, A Phone Number Tenure For Each Of The Plurality Of Phone Numbers, Based On The Plurality Of Metadata 815 Determining, By The Central Authority Server, A Phone Number Consistency For Each Of The Plurality Of Phone Numbers, Based On The Plurality Of Metadata 820 Conducting, By The Central Authority Server, A Real Time Phone Ownership Check For Each Of The Plurality Of Phone Numbers 825 Determining, By The Central Authority Server, A Most Reliable Phone Number Associated With The User From The Plurality Of Phone Numbers Based On The Phone Number Tenure, The Phone Number Consistency, And The Real Time Phone Ownership Check 830 Transmitting, By The Central Authority Server, To The Most Reliable Phone Number A SMS OTP 840 Authenticating, By The Central Authority Server, The User Based On The SMS OTP

SYSTEMS AND METHODS OF REDUCING FRAUD FOR SMS OTP AUTHENTICATION

FIELD OF THE INVENTION

The present disclosure relates generally to data security, and more particularly, to systems and methods for reducing fraud for short message service (SMS) one-time password (OTP) authentication.

BACKGROUND

Data security and transaction integrity are of critical importance to businesses and consumers. Fraudulent transactions can be very costly and disruptive for businesses and consumers, and attempts by fraudulent actors to perform fraudulent transactions or other fraudulent activities are increasing.

To counter fraud, customers are usually authenticated using multiple factors. Authentication via SMS OTP is a frequently used authentication method, however, fraud targeting SMS OTP authentication has been increasing. Examples of such fraud include unauthorized account takeovers, the creation of fraudulent accounts with fake phone numbers, and fraudulently tricking customer service personnel into changing numbers all contribute to fraud via SMS OTP.

These and other deficiencies exist. Accordingly, there is a need to provide systems and methods that overcome these deficiencies to reduce fraud for SMS OTP authentication.

SUMMARY

Aspects of the disclosed technology include systems and methods of reducing fraud.

Embodiments of the present disclosure provide a fraud reduction method for short message service (SMS) one-time password (OTP) authentication. The method comprises: receiving, by a server from a plurality of participating entities, a plurality of phone numbers and a plurality of metadata associated with a user, wherein at least one of the plurality of phone numbers and at least one of the plurality of metadata are received from each of the plurality of participating entities; determining, by the server, a phone number tenure for each of the plurality of phone numbers, based on the plurality of metadata; determining, by the server, a phone number consistency for each of the plurality of phone numbers, based on the plurality of metadata; determining, by the server, a device binding status for each of the plurality of phone numbers, based on the plurality of metadata; determining, by the server, a most reliable phone number associated with the user from the plurality of phone numbers based on the phone number tenure, the phone number consistency, and the device binding status; transmitting, by the server, to the most reliable phone number a SMS OTP; and authenticating, by the server, the user based on the SMS OTP.

Embodiments of the present disclosure provide a fraud reduction system for SMS OTP authentication. The system comprises a server, wherein the server comprise a processor and a memory coupled to the processor, and the server is configured to: receive, from plurality of participating entities, a plurality of phone numbers and a plurality of metadata associated with a user, wherein at least one of the plurality of phone numbers and at least one of the plurality of metadata are received from each of the plurality of participating entities; determine a phone number tenure for each of the plurality of phone numbers, based on the plurality of metadata; determine a phone number consistency for each of the plurality of phone numbers, based on the plurality of metadata; conduct a real time phone ownership check for one of the plurality of phone numbers; determine a most reliable phone number associated with the user from the plurality of phone numbers based on the phone number tenure, the phone number consistency, and the real time phone ownership check; transmit to the most reliable phone number a SMS OTP; and authenticate the user based on the SMS OTP.

Embodiments of the present disclosure provide a non-transitory, computer-readable medium comprising instructions for reducing fraud for SMS OTP authentication that, when executed on a computer arrangement, perform actions comprising: receiving, from a plurality of participating entities, a plurality of phone numbers and a plurality of metadata associated with a user, wherein at least one of the plurality of phone numbers and at least one of the plurality of metadata are received from each of the plurality of participating entities; determining a last date for an ownership check by a third party for each of the plurality of phone numbers; determining a phone number consistency for each of the plurality of phone numbers, based on the plurality of metadata; determining a device binding status for each of the plurality of phone numbers, based on the plurality of metadata; determining a most reliable phone number associated with the user from the plurality of phone numbers based on the phone number tenure, the phone number consistency, and the last date for an ownership check; transmitting to the most reliable phone number a SMS OTP; and authenticating the user based on the SMS OTP.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

FIG. 3 is a flow chart of a method for reducing fraud for SMS OTP authentication according to an example embodiment.

FIG. 4 is a flow chart of a method for reducing fraud for SMS OTP authentication according to an example embodiment.

FIG. 5 is a flow chart of a method for reducing fraud for SMS OTP authentication according to an example embodiment.

FIG. 6 is a flow chart of a method for reducing fraud for SMS OTP authentication according to an example embodiment.

FIG. 7 is a flow chart of a method for determining a most reliable phone number according to an example embodiment.

FIG. 8 is a flow chart of a method for reducing fraud for SMS OTP authentication according to an example embodiment.

DETAILED DESCRIPTION OF EXAMPLE EMBODIMENTS

Figure 1:
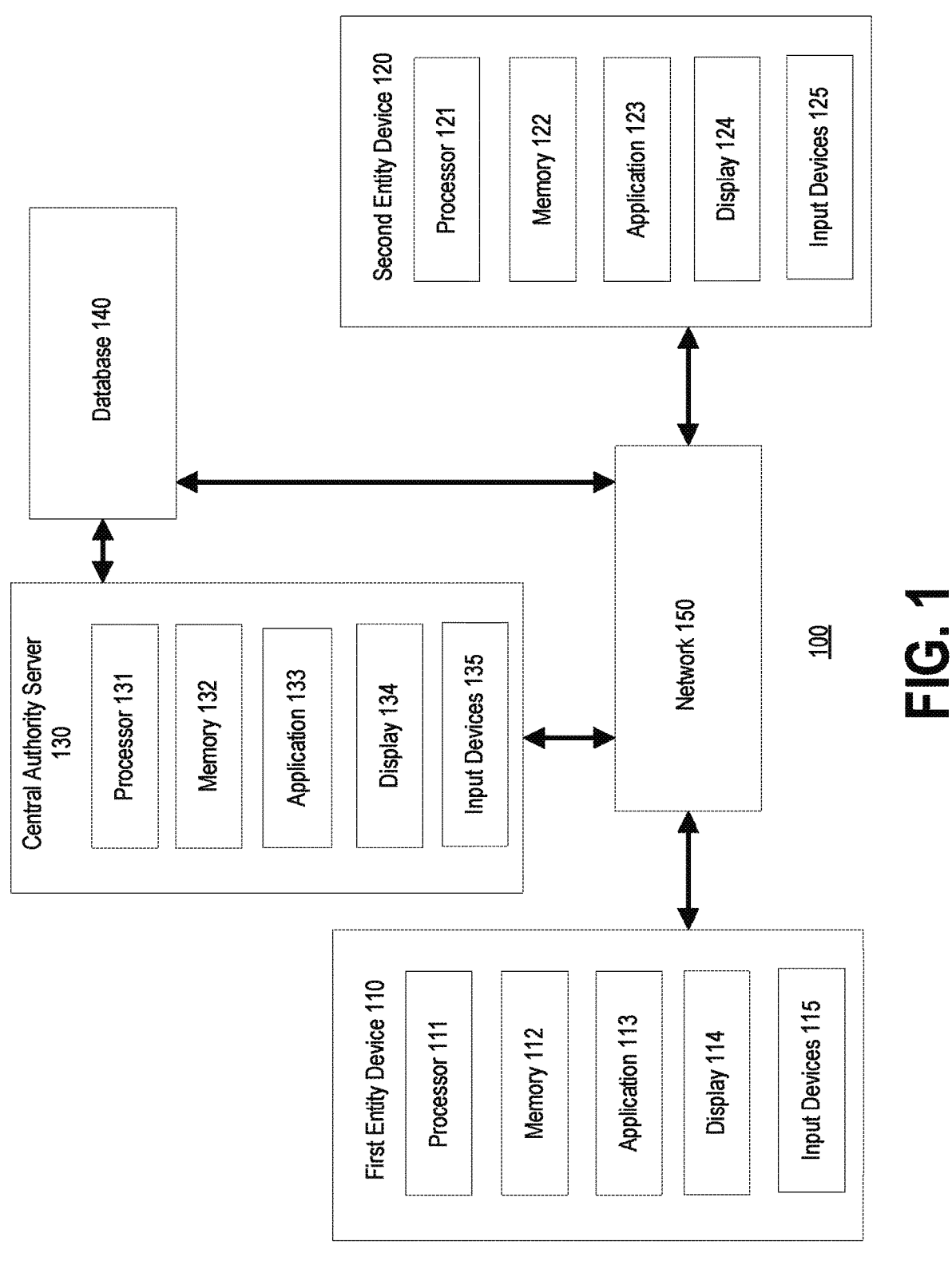
FIG. 1 is a diagram of a system for reducing fraud for SMS OTP authentication according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The described features and teachings of the embodiments may be combined in any suitable manner. A person of ordinary skill in the art will recognize that the embodiments may be practiced without one or more of the specific features and teachings of an embodiment. In other instances, additional features and teachings may be recognized in certain embodiments that may not be present in all embodiments. A person of ordinary skill in the art will understand that the described features and teachings of any embodiment can be interchangeably combined with the features and teachings of any other embodiment.

As described above, fraud for short message service (SMS) one-time password (OTP) authentication has been increasing. Unauthorized account takeovers, the creation of fraudulent accounts with fake phone numbers, and fraudulently tricking customer service personnel into changing numbers all contribute to fraud via SMS OTP. The present disclosure discloses a method for multiple participating entities (e.g., banks or other businesses) to algorithmically determine the most reliable phone number associated with a customer across all the multiple participating entities. The multiple participating entities can contribute their known primary mobile phone numbers associated with the customer along with other information associated with customer to allow for a determination of the most reliable phone number of that customer for SMS OTP contact. For example, the contributed information can include one or more of the following in any combination: mobile phone tenure (e.g., phone number that has been in active use the longest); mobile phone number consistency (e.g., how many entities have the same phone number), which may be determined by a central authority; real time phone ownership check (e.g., a check with the phone company or other authority in real time that the owner of the phone number matches the owner of the phone number known at the multiple participating entities); last successful SMS contact (e.g., how long ago did an entity last successfully contact the customer via SMS); device binding (e.g., when did the customer last log in on a device with that known phone number); last ownership check by a third party (e.g., a check of ownership with phone company or other authority); and tenure with an entity (e.g., how long has the phone number been on file with that entity).

The present disclosure makes account takeover at a single entity unlikely, thereby promoting fraud prevention and reducing the risk of fraud. For example, if a fraudulent actor changed the phone number, the phone number tenure and phone number match at other participating entities would identify the previous phone number as more reliable and the fraudulent new phone number wouldn't be selected from lists of possible phone numbers provided by the entities.

Example embodiments of the present disclosure provide systems and methods for reducing bank fraud for SMS OTP authentication. The present disclosure discloses a method for multiple participating entities (e.g., banks or other businesses) to algorithmically determine the most reliable phone number associated with a customer across all the multiple participating entities. The multiple participating entities can contribute their known primary mobile phone numbers associated with the customer along with other information associated with customer to allow for a determination of the most reliable or most reliable phone number of that customer for SMS OTP contact.

In the systems and methods disclosed herein, a number of entities (e.g., the participating banks and other businesses), can contribute phone numbers of their customers into a central authority system. For example, if a customer is associated with more than one entity, then a first entity may send in to the central authority system a phone number of the customer that is stored by the first entity, a second entity may send in to the central authority system a phone number of the customer that is stored by the second entity, and so forth. The phone numbers provided by the entities may be the same phone number or different phone numbers of the customer. The central authority system can determine the most reliable phone number as the phone number for SMS OTP authentication of the customer for the participating entities. If one of the entities has more than one phone number of the customer, that entity can send in the multiple phone numbers of the customer to the central authority system. Alternatively, that entity may just send in one of the phone numbers of the customer, which is the most reliable one phone number of the customer determined by that entity. The central authority system can determine a most reliable phone number from the phone numbers contributed by the participating entities for SMS OTP authentication, so the customer does not need to pick a phone number from a list of phone numbers, or does not need to type in a phone number when the customer is required for a SMS OTP authentication. The one most reliable phone number can be a phone number that is unknown to one of the participating entities because the customer may have not updated their phone number associated with that entity.

To determine the most reliable phone number from the phone numbers sent in by the participating entities, the central authority system may consider the following factors, including, without limitation: how long has that phone number been on file with the participating entities; phone number consistency (e.g., how many entities use that phone number); whether one entity is using one phone number but the other entities are all using a different phone number; a time of the last SIM card check; the time a most recent successful SMS contact was sent to that phone number by any of the participating entities; whether the most recent device binding for a device associated with the phone number; whether the device binding was performed through a contactless card; the time of the last ownership check done on the phone number (e.g., an ownership check that the phone number matches a home address of the customer, instead of a particular address).

After the customer has identified herself/himself through an email address or any other method of identification, for example, as one authentication factor, the systems and methods disclosed herein can choose the central authority system and then pick the one most reliable phone number to send to the customer for SMS OTP authentication. In some examples, the most reliable phone number can be a phone number shared by the multiple participating entities. In some examples, the most reliable phone number can be a phone number that has a significant tenure there. In some examples, the most reliable phone number can be a phone number where there have been a SMS OTP that has been performed by one of the participating entities. By considering these factors, the central authority system can pick the most reliable phone number to send to the customer for an SMS OTP authentication, and in this case the most reliable phone number can be determined with more confidence than any of the individual entities would do by themselves.

In some embodiments, the present disclosure can allow an entity to identify a phone number that it can use to verify the customer, but the entity might not have this phone number on record. For example, if other entities have a phone number that this entity might not have, this can give this entity an opportunity to verify the customer using a phone number that is even not with this entity. In this case, this entity can get access to a multi-entity verified phone number.

The present discloser can assign a different risk score to each one of the plurality of phone numbers collected from the multiple participating entities. A confidence score may be generated for each one of the plurality of phone numbers based on the risk score.

Similarly, emails, home addresses, and/or other information of customers can also be collected by the central authority system from the multiple participating entities. The emails, home addresses, and/or other information of customers can be ranked to determine a most reliable email, home address, and/or other information of the customers. When a customer would like to create an account, such as an online shopping account with a merchant, the most reliable phone number, email, home address, and/or other information of that customers can be used for creating the account, which would be a stronger account because the data associated with the account are drawn from all the different entities, and also the account information can be autofilled in with the most reliable phone number, the most reliable email, the most reliable address picked from the entities.

In some embodiments, a variety of different risks, confidence or thresholds can be assigned to the phone numbers based on categories or transactions. For example, for a low risk transaction, such as an account inquiry transaction (e.g., to determine how many rewards points an account has), a phone number can be assigned a low risk. For a high risk transaction, such as a transaction to transfer money, the phone number can be assigned a high risk. A rule-based model or a risk-based artificial intelligence (AI) machine-learning model may be used to determine the risk, for example, the model may notify a customer that two numbers have been located and provide the customer with an instruction to bind one of those numbers to his or her device, but otherwise permit the customer to carry out the low-risk transaction with an unbound phone number. For a high risk transaction, the model may not allow an unbound phone number to be used. However, in other examples, an unbound phone number may also be allowed for a money transfer transaction, if it is determined that the customer has bound this phone number to other entities and used it for other transactions.

In some embodiments, with respect to phone tenure with an entity, the entity knows when that phone number was first entered, the time and date of the last time interaction with the customer using that phone number (e.g., through a phone call or an SMS OTP). The phone tenure with an entity can be a date when the phone number either was last updated or it was last interacted with that entity. In this case, the participating entities would be providing the metadata including, for example, the last meaningful interaction, last interaction that successfully resulted in an authentication, or an ignored text message.

With respect to a new phone number entered by a customer, an entity may attempt to establish a new device of the customer as a trusted device using the new phone number. For example, the entity can transmit an SMS OTP using the new phone number to bind the new device. If the bank determines that the new phone number is currently in use by other entities and has been authenticated by other entities, this entity can bind the new device to the new phone number with a much lower risk because such behavior is generally consistent with a consumer and not a fraudulent actor.

With respect to ranking the phone numbers based on the above factors, a model can be used to determine confidence scores of each phone number and to compare the confidence scores versus thresholds. In some examples, the model can be a rule-based model and in other examples the model can be an AI machine learning model.

Further, when a new phone number is set up with an entity or when a new phone number is bound to a device, that entity may broadcast the new phone number in real time to all the participating entities. Other participating entities may be aware that this could be a potentially fraudulent activity, and the other participating entities may confirm with their customers regarding the validity and current status of the phone numbers associated their devices. If the validity of the new phone number is not confirmed, the other participating entities may provide notice that this may be a fraudulent actor.

In some embodiments, the device binding may be performed by an entity's application (e.g., an entity application executing on a user's device). For example, this could be performed via an SMS OTP or a contactless card tap.

In some embodiments, the most reliable phone number can be determined via a rules-based process across the participating entities. For example, a number of rules can be created as exclusions. The entity application can be an authenticator application. In some embodiments, an AI machine learning model can be used to determine the most reliable phone number. The AI machine learning model can aggregate the different factors as above described and come up with the most reliable possible phone number across the participating entities. The AI machine learning model can determine a risk score associated with each phone number for each affecting factors. The most reliable phone number can be determined by the AI machine learning model by calculating an average risk score for each phone number. For example, the average risk score of a phone number can be calculated by assigning a different or same weight to each risk score associated with an corresponding factor across all the affecting factors, such as the phone number consistency and the phone number tenure. The most reliable phone number can be the phone number that has a lowest average risk score. In some embodiments, a rules-based process and the AI machine learning model can be combined to determine the most reliable phone number.

FIG. 1 illustrates a system 100 for reducing fraud for SMS OTP authentication according to an example embodiment. As further discussed below, the system 100 may include a first entity device 110, a second entity device 120, a central authority server 130, and a database 140 in communication using a network 150 and the central authority server 130. Although FIG. 1 illustrates single instances of the components, the system 100 may include any number of components.

The first entity device 110 may be associated with a bank, a merchant or a company with which transactions are conducted by a user through a user device, for example, online purchases made from the merchant. The first entity device 110 may also be associated with a call and/or service center to which the user may make a call to initiate a transaction such as discussing product and/or service issues. If the first entity device 110 is associated with a merchant, the first entity device 110 can be configured to store the online merchant accounts, and to present a shopping interface on which the user can conduct the transactions with the merchant. If the first entity device 110 is associated with a bank, the first entity device 110 can be configured to store the online financial accounts information, and to present a user interface on which the user can conduct the transactions with the bank.

The first entity device 110 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The first entity device 110 may include a processor 111, a memory 112, and an application 113. The processor 111 may be a processor, a microprocessor, or other processor, and the first entity device 110 may include one or more of these processors. The processor 111 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 111 may be coupled to the memory 112. The memory 112 may be a read-only memory, write-once read-multiple memory or read/write memory, e.g., RAM, ROM, and EEPROM, and the first entity device 110 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 112 may be configured to store one or more software applications, such as the application 113, and other data, such as user's shopping and financial account information.

The application 113 may comprise one or more software applications comprising instructions for execution on the first entity device 110. In some examples, the first entity device 110 may execute one or more applications, such as software applications, that enable, for example, network communications with one or more components of the system 100, transmit and/or receive data, and perform the functions described herein. Upon execution by the processor 111, the application 113 may provide the functions described in this specification, specifically to execute and perform the steps and functions in the process flows described below. For example, the application 113 may be executed to perform authenticating the user through a SMS OTP message or send an authentication request of authenticating the user to the central authority server 130. The application 113 may also be executed to perform processing transactions of the user who may shop online from the merchant or interact with the bank. Such processes may be implemented in software, such as software modules, for execution by computers or other machines. The application 113 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The first entity device 110 may further include a display 114 and input devices 115. The display 114 may be any type of device for presenting visual information such as a computer monitor, a flat panel display, and a mobile device screen, including liquid crystal displays, light-emitting diode displays, plasma panels, and cathode ray tube displays. The input devices 115 may include any device for entering information into the first entity device 110 that is available and supported by the first entity device 110, such as a touch-screen, keyboard, mouse, cursor-control device, touch-screen, microphone, digital camera, video recorder or camcorder. These devices may be used to enter information and interact with the software and other devices described herein.

The second entity device 120 may be associated with a bank, a merchant or a company with which transactions are conducted by a user through a user device, for example, online purchases made from the merchant. The second entity device 120 may also be associated with a call and/or service center to which the user may make a call to initiate a transaction such as discussing product and/or service issues. If the second entity device 120 is associated with a bank, the second entity device 120 can be configured to store the online financial accounts information, and to present a user interface on which the user can conduct the transactions with the bank. The second entity device 120 may be configured to present to the user a user interface from which the user may log into, for example, their bank or credit card account to access their transaction statement and/or financial information. If the second entity device 120 is associated with a merchant, the second entity device 120 can be configured to store the online merchant accounts, and to present a shopping interface on which the user can conduct the transactions with the merchant.

The second entity device 120 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second entity device 120 may include a processor 121, a memory 122, an application 123, a display 124, and input devices 125. The processor 121 may be a processor, a microprocessor, or other processor, and the second entity device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the second entity device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as private and personal information.

The application 123 may comprise one or more software applications comprising instructions for execution on the second entity device 120. In some examples, the second entity device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphic user interfaces (GUIs) through which users may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The second entity device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the second entity device 120 that is available and supported by the second entity device 120, such as a touch-screen, keyboard, mouse, cursor-control device, touch-screen, microphone, digital camera, video recorder or camcorder. These devices may be used to enter information and interact with the software and other devices described herein such as selecting an option of creating an online account with the merchant.

The central authority server 130 may be associated with an institution, such as a financial institution, and can be configured to communicate with the first entity device 110 and the second entity device 120. The central authority server 130 may be configured to communicate with the database 140 for storing user private information.

The central authority server 130 may be a network-enabled computer device. Exemplary network-enabled computer devices include, without limitation, a contactless card, a server, a network appliance, a personal computer, a workstation, a phone, a handheld personal computer, a personal digital assistant, a thin client, a fat client, an Internet browser, a mobile device, a kiosk, or other a computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The central authority server 130 may include a processor 131, a memory 132, and an application 133. The processor 131 may be a processor, a microprocessor, or other processor, and the central authority server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the central authority server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as user's financial account information.

The application 133 may comprise one or more software applications comprising instructions for execution on the central authority server 130. In some examples, the central authority server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the application 133 may be executed to determine a most reliable phone number associated with the user. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The central authority server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the central authority server 130 that is available and supported by the central authority server 130, such as a touch-screen, keyboard, mouse, cursor-control device, touch-screen, microphone, digital camera, video recorder or camcorder. These devices may be used to enter information and interact with the software and other devices described herein.

The database 140 may be one or more databases configured to store date, including without limitation, private information of users including mobile phone numbers and email addresses, financial accounts of users, contactless card information, online merchant account information, transactions of users, and merchant records indicative of corresponding merchants. The database 140 may comprise a relational database, a non-relational database, or other database implementations, and any combination thereof, including a plurality of relational databases and non-relational databases. In some examples, the database 140 may comprise a desktop database, a mobile database, or an in-memory database. Further, the database 140 may be hosted internally by the central authority server 130 or may be hosted externally of the central authority server 130, such as by a server other than the central authority server 130, by a cloud-based platform, or in any storage device that is in data communication with the central authority server 130.

The system 100 may include one or more networks 150. In some examples, the network 150 may be one or more of a wireless network, a wired network or any combination of wireless network and wired network, and may be configured to connect the first entity device 110, the second entity device 120, the central authority server 130, and the database 140. For example, the network 150 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 150 may include, without limitation, telephone lines, fiber optics, IEEE Ethernet 902.3, a wide area network, a wireless personal area network, a LAN, or a global network such as the Internet. In addition, the network 150 may support an Internet network, a wireless communication network, a cellular network, or the like, or any combination thereof. The network 150 may further include one network, or any number of the exemplary types of networks mentioned above, operating as a stand-alone network or in cooperation with each other. The network 150 may utilize one or more protocols of one or more network elements to which they are communicatively coupled. The network 150 may translate to or from other protocols to one or more protocols of network devices. Although the network 150 is depicted as a single network, it should be appreciated that according to one or more examples, the network 150 may comprise a plurality of interconnected networks, such as, for example, the Internet, a service provider's network, a cable television network, corporate networks, such as credit card association networks, and home networks. The network 150 may further comprise, or be configured to create, one or more front channels, which may be publicly accessible and through which communications may be observable, and one or more secured back channels, which may not be publicly accessible and through which communications may not be observable.

In some examples, communications between the first entity device 110, central authority server 130, and second entity device 120 using the network 150 can occur using one or more front channels and one or more secure back channels. A front channel may be a communication protocol that employs a publicly accessible and/or unsecured communication channel such that a communication sent to the first entity device 110, central authority server 130, and/or second entity device 120 may originate from any other device, whether known or unknown to the first entity device 110, central authority server 130, and/or second entity device 120, if that device possesses the address (e.g., network address, Internet Protocol (IP) address) of the first entity device 110, central authority server 130, and/or second entity device 120. Exemplary front channels include, without limitation, the Internet, an open network, and other publicly-accessible communication networks. In some examples, communications sent using a front channel may be subject to unauthorized observation by another device. In some examples, front channel communications may comprise Hypertext Transfer Protocol (HTTP) secure socket layer (SSL) communications, HTTP Secure (HTTPS) communications, and browser-based communications with a server or other device.

A secure back channel may be a communication protocol that employs a secured and/or publicly inaccessible communication channel. A secure back channel communication sent to the first entity device 110, central authority server 130, and/or second entity device 120 may not originate from any device, and instead may only originate from a selective number of parties. In some examples, the selective number of devices may comprise known, trusted, or otherwise previously authorized devices. Exemplary secure back channels include, without limitation, a closed network, a private network, a virtual private network, an offline private network, and other private communication networks. In some examples, communications sent using a secure back channel may not be subject to unauthorized observation by another device. In some examples, secure back channel communications may comprise Hypertext Transfer Protocol (HTTP) secure socket layer (SSL) communications, HTTP Secure (HTTPS) communications, and browser-based communications with a server or other device.

Figure 2:
FIG. 2 is a diagram of sequential interactions between components of the system in FIG. 1 according to an example embodiment.

FIG. 2 illustrates an example diagram 200 of sequence interaction between the components of the system 100 according to an example embodiment. FIG. 2 may reference the same or similar components as those illustrated in FIG. 1, including a second entity device, a central authority server, a database, and a first entity device.

When a user is associated with a plurality of entities, the user may have personal or private information stored with the plurality entities, such as email address, home address, home phone number, mobile phone number, credit card information, and so forth. The plurality of entities can be banks, companies, and/or merchants, and those entities may participate in fraud prevention administered by a central authority system that is associated with the central authority server 130. The personal information of the user can be the same or different for each of the plurality of entities. For example, the phone number of the user stored at a first entity may be the same as or different from the phone number of the user stored at a second entity. Similarly, email address of the user stored at the first entity may be the same as or different from the email address of the user stored at the second entity. Also the user may store one or more phone numbers, email address, and/or other information at an entity. For example, the user may store a primary mobile phone number, a primary email address, and/or a primary payment card at an entity, and also store a secondary mobile phone number, email address, and/or payment card at that entity. Accordingly, those participating entities can each contribute to the central authority system one or more phone number associated with the user that is stored at that entity. Although FIG. 2 shows only two entities (a first entity and a second entity), any number of participating entities can be included.

When the first entity transmits through the first entity device 110 to the central authority server 130 at least one phone number and metadata associated with a user that is stored by the first entity, in step 210, accordingly, the central authority server 130 receives from the first entity device 110 the at least one phone number and the metadata associated with the user. The at least one phone number may include one or more mobile phone number, such as a primary phone number and/or one or more secondary phone numbers. The metadata can include, but is not limited to, the last meaningful interaction between the first entity and the user, the last interaction that worked in authentication of the user by the first entity, and/or an ignored text message received by the user from the first entity.

Similarly, when the second entity transmits through the second entity device 120 to the central authority server 130 at least one phone number and metadata associated with a user that is stored by the second entity, in step 215, accordingly, the central authority server 130 receives from the second entity device 120 the at least one phone number and the metadata associated with the user. The at least one phone number may include one or more mobile phone number, such as a primary phone number and/or one or more secondary phone numbers. The metadata can include, but is not limited to, the last meaningful interaction between the second entity and the user, the last interaction that worked in authentication of the user by the second entity, and/or an ignored text message received by the user from the second entity.

In step 220, the central authority server 130 may store on the database 140 the phone numbers and the metadata received from the first entity device 110 and the second entity device 120.

In step 225, the central authority server 130 may determine a phone number tenure for each of the phone numbers based on the metadata. The phone number tenure can indicate how long that phone number has been in active use with the corresponding entity. A phone number that has a longest tenure can indicate that that phone number has been in active use the longest.

In step 230, the central authority server 130 may determine a phone number consistency for each of the phone numbers based on the metadata. The phone number consistency can indicate the same phone number is shared by how many entities. The more entities that share the same phone number, the larger the phone number consistency of that phone number, and the more reliable that phone number.

In step 235, the central authority server 130 may determine a device binding status for each of the phone numbers based on the metadata. The device bind status of a phone number can indicate when the user last logged in on a device with that phone number, and/or how the user logged in, for example, by using a credit card or login credentials. The device bind status of a phone number can also indicate when the user first logged in on a device with that phone number.

In step 240, the central authority server 130 may determine a most reliable phone number of the user from the phone numbers received from the first entity device 110 and the second entity device 120, based on the phone number tenure for each of the phone numbers, the phone number consistency for each of the phone numbers, and the device binding status for each of the phone numbers. The most reliable phone number may be determined based on an average risk score of each phone number. For example, in each category: the phone number tenure, the phone number consistency and the device binding status, a risk score is determined for each phone number. A phone number having a longer tenure can be assigned a lower risk score, whereas a phone number having a shorter tenure can be assigned a higher risk score. The higher the risk score, the more likely the phone number is a fraudulent phone number. A phone number having a higher consistency can be assigned a lower risk score, whereas a phone number having a lower consistency can be assigned a higher risk score. The higher the risk score, the more likely the phone number is a fraudulent phone number. A phone number having an earlier date binding status can be assigned a lower risk score, whereas a phone number having a later date binding status can be assigned a higher risk score. The higher the risk score, the more likely the phone number is a fraudulent phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the binding status. The phone number having the lowest average risk score would be determined to be the most reliable phone number.

In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the first entity device 110 and the second entity device 120.

Alternatively, instead of a risk score, a confidence score can be assigned to each category for each phone number. The higher the confidence score the more reliable the phone number. Similarly an average confidence score can be calculated for each phone number based on the confidence score in each category. The phone number having the highest average confidence score would be determined to be the most reliable phone number.

In step 245, the central authority server 130 transmits the most reliable phone number to the first entity device 110, such that the first entity can be aware of which phone number is the most reliable phone number for them to interact with the user, which can reduce potential fraud.

In step 250, the central authority server 130 transmits the most reliable phone number to the second entity device 120, such that the second entity can be aware of which phone number is the most reliable phone number for them to interact with the user, which can reduce potential fraud.

In step 255, the central authority server 130 may authenticate the user based on a SMS OTP using the most reliable phone number. For example, the central authority server 130 may transmit a SMS OTP message to the most reliable phone number.

FIG. 3 illustrates a flow chart of an example method 300 for reducing fraud for SMS OTP authentication according to an example embodiment. FIG. 3 may reference the same or similar components as those illustrated in FIGS. 1 and 2, including a first entity device 110, a second entity device 120, a central authority server 130, and a database 140. The method 300 can be implemented in the system 100 and may include, but is not limited to the following steps.

In step 305, the central authority server 130 receives from a plurality of participating entities such as the first entity device 110 and the second entity device 120, a plurality of phone numbers and a plurality of metadata associated with a user. At least one of the plurality of phone numbers and at least one of the plurality of metadata are received from each of the plurality of participating entities. The at least one phone number may include one or more mobile phone numbers, such as a primary phone number and/or one or more secondary phone numbers. The metadata can include, but is not limited to, the last meaningful interaction between any or each of the plurality of participating entities and the user, the last interaction that resulted in successful authentication of the user by any or each of the plurality of participating entities, and/or an ignored text message received by the user from any or each of the plurality of participating entities.

In step 310, the central authority server 130 may determine, a phone number tenure for each of the plurality of phone numbers, based on the plurality of metadata. The phone number tenure can indicate how long that phone number has been in active use with the corresponding entity. A phone number that has a longest tenure can indicate that that phone number has been in active use the longest.

In step 315, the central authority server 130 may determine a phone number consistency for each of the plurality of phone numbers, based on the plurality of metadata. The phone number consistency can indicate the same phone number is shared by how many entities. The more entities that share the same phone number, the larger the phone number consistency of that phone number, and the more reliable that phone number.

In step 320, the central authority server 130 may determine a device binding status for each of the plurality of phone numbers, based on the plurality of metadata. The device bind status of a phone number can indicate when the user last logged in on a device with that phone number, and/or how the user logged in, for example, by using a credit card or login credentials. The device bind status of a phone number can also indicate when the user first logged in on a device with that phone number.

In step 325, the central authority server 130 may determine a most reliable phone number of the user from the plurality of phone numbers, based on the phone number tenure for each of the phone numbers, the phone number consistency for each of the phone numbers, and the device binding status for each of the phone numbers. The most reliable phone number may be determined based on an average risk score of each phone number. For example, in each category: the phone number tenure, the phone number consistency and the device binding status, a risk score is determined for each phone number. A phone number having a longer tenure can be assigned a lower risk score, whereas a phone number having a shorter tenure can be assigned a higher risk score. The higher the risk score, the more likely the phone number is a fraudulent phone number. A phone number having a higher consistency can be assigned a lower risk score, whereas a phone number having a lower consistency can be assigned a higher risk score. The higher the risk score, the more likely the phone number is a fraudulent phone number. A phone number having an earlier date binding status can be assigned a lower risk score, whereas a phone number having a later date binding status can be assigned a higher risk score. The higher the risk score, the more likely the phone number is a fraudulent phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the binding status. The phone number having the lowest average risk score would be determined to be the most reliable phone number.

In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the plurality of participating entities.

In some embodiments, instead of a risk score, a confidence score can be assigned to each category for each phone number. The higher the confidence score the more reliable the phone number. Similarly an average confidence score can be calculated for each phone number based on the confidence score in each category. The phone number having the highest average confidence score would be determined to be the most reliable phone number.

In step 330, the central authority server 130 transmits a SMS OTP message to the most reliable phone number. In step 335, the central authority server 130 may authenticate the user based on the SMS OTP, depending on a response to the SMS OTP from the user.

FIG. 4 illustrates a flow chart of an example method 400 for reducing fraud for SMS OTP authentication according to an example embodiment. FIG. 4 may reference the same or similar components as those illustrated in FIGS. 1-3 including a second entity device 120, a central authority server 130, a database 140, and a first entity device 110. The method 400 can be implemented in the system 100 and may include, but is not limited to the following steps.

In step 405, the central authority server 130 receives from a plurality of participating entities such as the first entity device 110 and the second entity device 120, a plurality of phone numbers and a plurality of metadata associated with a user. At least one of the plurality of phone numbers and at least one of the plurality of metadata are received from each of the plurality of participating entities. The at least one phone number may include one or more mobile phone number, such as a primary phone number and/or one or more secondary phone numbers. The metadata can include, but is not limited to, the last meaningful interaction between any or each of the plurality of participating entities and the user, the last interaction that resulted in successful authentication of the user by any or each of the plurality of participating entities, and/or an ignored text message received by the user from any or each of the plurality of participating entities.

In step 410, the central authority server 130 may determine a phone number tenure for each of the plurality of phone numbers, based on the plurality of metadata. The phone number tenure can indicate how long that phone number has been in active use with the corresponding entity. A phone number that has a longest tenure can indicate that that phone number has been in active use the longest.

In step 415, the central authority server 130 may determine a phone number consistency for each of the plurality of phone numbers, based on the plurality of metadata. The phone number consistency can indicate the same phone number is shared by how many entities. The more entities that share the same phone number, the larger the phone number consistency of that phone number, and the more reliable that phone number.

In step 420, the central authority server 130 may determine a device binding status for each of the plurality of phone numbers, based on the plurality of metadata. The device bind status of a phone number can indicate when the user last logged in on a device with that phone number, and/or how the user logged in, for example, by using a credit card or login credentials. The device bind status of a phone number can also indicate when the user first logged in on a device with that phone number.

In step 425, the central authority server 130 may determine a most reliable phone number of the user from the plurality of phone numbers, based on the phone number tenure for each of the phone numbers, the phone number consistency for each of the phone numbers, and the device binding status for each of the phone numbers. The most reliable phone number may be determined based on an average risk score of each phone number. For example, in each category: the phone number tenure, the phone number consistency and the device binding status, a risk score is determined for each phone number. A phone number having a longer tenure can be assigned a lower risk score, whereas a phone number having a shorter tenure can be assigned a higher risk score. The higher the risk score, the more likely the phone number is a fraudulent phone number. A phone number having a higher consistency can be assigned a lower risk score, whereas a phone number having a lower consistency can be assigned a higher risk score. The higher the risk score, the more likely the phone number is a fraudulent phone number. A phone number having an earlier date binding status can be assigned a lower risk score, whereas a phone number having a later date binding status can be assigned a higher risk score. The higher the risk score, the more likely the phone number is a fraudulent phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the binding status. The phone number having the lowest average risk score would be determined to be the most reliable phone number.

In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the plurality of participating entities.

In some embodiments, instead of a risk score, a confidence score can be assigned to each category for each phone number. The higher the confidence score the more reliable the phone number. Similarly an average confidence score can be calculated for each phone number based on the confidence score in each category. The phone number having the highest average confidence score would be determined to be the most reliable phone number.

In step 430, the central authority server 130 transmits the most reliable phone number to each of the plurality of participating entities, such that each of the plurality of participating entities can be aware of which phone number is the most reliable phone number for them to interact with the user, which can reduce potential fraud.

FIG. 5 illustrates a flow chart of an example method 500 for reducing fraud for SMS OTP authentication according to an example embodiment. FIG. 5 may reference the same or similar components as those illustrated in FIGS. 1-5 including a second entity device 120, a central authority server 130, a database 140, and a first entity device 110. The method 500 can be implemented in the system 100 and may include, but is not limited to the following steps.

In step 505, each participating entity of a plurality of participating entities transmits using that participating entity's device to a central authority server (e.g., the central authority server 130) at least one phone number and metadata associated with a user. For example, a first entity using a first entity device 110 transmits at least one phone number and metadata associated with the user that is stored by the first entity device 110, and a second entity using a second entity device 120 transmits at least one phone number and metadata associated with the user that is stored by the second entity device 120.

In step 510, the participating entity using the participating entity's device receives from the central authority server 130, a most reliable phone number determined by the central authority server 130 from the plurality of phone numbers that are transmitted by each of the plurality of participating entities.

In step 515, the participating entity using the participating entity's device authenticates the user based on a first authentication factor. The first authentication factor may include but not limited to, an email address of the user, a login credential of the user, a fingerprint of the user, a face expression of the user, a payment card, and so forth.

In step 520, the participating entity using the participating entity's device transmits to the most reliable phone number a SMS OTP as a second authentication factor. For example, the most reliable phone number may be associated with a user device of the user, so the SMS OTP message can be transmitted to the user device of the user.

In step 525, the participating entity using the participating entity's device authenticates the user based on the SMS OTP as the second authentication factor, depending on a response to the SMS OTP from the user.

In such way, each participating entity can the most reliable phone number to interact with the user, so that potential fraud can be eliminated or reduced.

FIG. 6 illustrates a flow chart of an example method 600 for reducing fraud for SMS OTP authentication according to an example embodiment. FIG. 6 may reference the same or similar components as those illustrated in FIGS. 1-5, including a second entity device 120, a central authority server 130, a database 140, and a first entity device 110. The method 600 can be implemented in the system 100 and may include, but is not limited to the following steps.

In step 605, the central authority server 130 receives from a plurality of participating entities such as the first entity device 110 and the second entity device 120, a plurality of phone numbers and a plurality of metadata associated with a user. At least one of the plurality of phone numbers and at least one of the plurality of metadata are received from each of the plurality of participating entities. The at least one phone number may include one or more mobile phone number, such as a primary phone number and/or one or more secondary phone numbers. The metadata can include, but is not limited to, the last meaningful interaction between any or each of the plurality of participating entities and the user, the last interaction that resulted in successful authentication of the user by any or each of the plurality of participating entities, and/or an ignored text message received by the user from any or each of the plurality of participating entities.

In step 610, the central authority server 130 may determine, a phone number tenure for each of the plurality of phone numbers, based on the plurality of metadata. The phone number tenure can indicate how long that phone number has been in active use with the corresponding entity. A phone number that has a longest tenure can indicate that that phone number has been in active use the longest.

In step 615, the central authority server 130 may determine a phone number consistency for each of the plurality of phone numbers, based on the plurality of metadata. The phone number consistency can indicate the same phone number is shared by how many entities. The more entities that share the same phone number, the larger the phone number consistency of that phone number, and the more reliable that phone number.

In step 620, the central authority server 130 may determine a device binding status for each of the plurality of phone numbers, based on the plurality of metadata. The device bind status of a phone number can indicate when the user last logged in on a device with that phone number, and/or how the user logged in, for example, by using a credit card or login credentials. The device bind status of a phone number can also indicate when the user first logged in on a device with that phone number.

In step 625, the central authority server 130 may determine a most reliable phone number of the user from the plurality of phone numbers, based on the phone number tenure for each of the phone numbers, the phone number consistency for each of the phone numbers, and the device binding status for each of the phone numbers. The most reliable phone number may be determined based on an average risk score of each phone number. For example, in each category: the phone number tenure, the phone number consistency and the device binding status, a risk score is determined for each phone number. A phone number having a longer tenure can be assigned a lower risk score, whereas a phone number having a shorter tenure can be assigned a higher risk score. The higher the risk score, the more likely the phone number is a fraudulent phone number. A phone number having a higher consistency can be assigned a lower risk score, whereas a phone number having a lower consistency can be assigned a higher risk score. The higher the risk score, the more likely the phone number is a fraudulent phone number. A phone number having an earlier date binding status can be assigned a lower risk score, whereas a phone number having a later date binding status can be assigned a higher risk score. The higher the risk score, the more likely the phone number is a fraudulent phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the binding status. The phone number having the lowest average risk score would be determined to be the most reliable phone number.

In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the plurality of participating entities.

In some embodiments, instead of a risk score, a confidence score can be assigned to each category for each phone number. The higher the confidence score the more reliable the phone number. Similarly an average confidence score can be calculated for each phone number based on the confidence score in each category. The phone number having the highest average confidence score would be determined to be the most reliable phone number.

In step 630, the central authority server 130 authenticates the user based on a first authentication factor. The first authentication factor may include but not limited to, an email address of the user, a login credential of the user, a fingerprint of the user, a face expression of the user, a payment card, and so forth.

In step 635, the central authority server 130 transmits a SMS OTP message as a second authentication factor to the most reliable phone number. In step 640, the central authority server 130 may authenticate the user based on the SMS OTP as the second authentication factor, depending on a response to the SMS OTP from the user.

FIG. 7 illustrates a flow chart of an example method 700 for determining a most reliable phone number using a machine learning model according to an example embodiment. FIG. 7 may reference the same or similar components as those illustrated in FIGS. 1-6, including a second entity device 120, a central authority server 130, a database 140, and a first entity device 110. The method 700 can be implemented in the system 100 and may include, but is not limited to the following steps.

The most reliable phone number may be determined by the central authority server 130 using a machine learning model. The central authority server 130 may train the machine learning model using the plurality of phone numbers and the plurality of metadata received from the plurality of participating entities. The machine learning model employed can include at least one selected from the group of gradient boosting machine, logistic regression, neural networks, and a combination thereof, however, it is understood that other machine learning algorithms can be utilized.

The machine learning model can utilize a Bidirectional Encoder Representations from Transformers (BERT) models. BERT models utilize multiple layers of so called "attention mechanisms" to process textual data and make predictions. These attention mechanisms effectively allow the BERT model to learn and assign more importance to words from the text input that are more important in making whatever inference is trying to be made.

Alternatively, the machine learning model described herein can utilize various neural networks, such as convolutional neural networks (CNNs) or recurrent neural networks (RNNs), to generate the exemplary models. A CNN can include one or more convolutional layers (e.g., often with a subsampling step) and then followed by one or more fully connected layers as in a standard multilayer neural network. CNNs can utilize local connections, and can have tied weights followed by some form of pooling which can result in translation invariant features.

A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that cannot be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The machine learning model described herein can be trained on one or more training datasets, each of which can comprise one or more types of data. In some examples, the training datasets can comprise previously-collected data, such as data collected from previous uses of the same type of systems described herein and data collected from different types of systems. In other examples, the training datasets can comprise continuously-collected data based on the current operation of the instant system and continuously-collected data from the operation of other systems. In some examples, the training dataset can include anticipated data, such as the anticipated future events, currently scheduled events, and planned future events, for the instant system and/or other systems. In other examples, the training datasets can include previous predictions for the instant system and other types of system, and can further include results data indicative of the accuracy of the previous predictions. In accordance with these examples, the machine learning model described herein can be trained prior to use and the training can continue with updated data sets that reflect additional information.

Examples of the machine learning model that may be implemented include a hidden Markov model, a Gaussian mixture model, a pattern matching algorithm, a neural network, a matrix representation, (a vector quantization and decision tree, a supervised learning model, an unsupervised learning model, a semi-supervised learning model, a reinforcement learning model, a self-learning model, and a feature learning model.

By employing the machine learning model, in step 705, the central authority server 130 receives from a plurality of participating entities such as the first entity device 110 and the second entity device 120, a plurality of phone numbers and a plurality of metadata associated with a user. At least one of the plurality of phone numbers and at least one of the plurality of metadata are received from each of the plurality of participating entities. The at least one phone number may include one or more mobile phone number, such as a primary phone number and/or one or more secondary phone numbers. The metadata can include, but is not limited to, the last meaningful interaction between any or each of the plurality of participating entities and the user, the last interaction that resulted in successful authentication of the user by any or each of the plurality of participating entities, and/or an ignored text message received by the user from any or each of the plurality of participating entities.

In step 710, the central authority server 130 may determine, a phone number tenure for each of the plurality of phone numbers, based on the plurality of metadata. The phone number tenure can indicate how long that phone number has been in active use with the corresponding entity. A phone number that has a longest tenure can indicate that that phone number has been in active use the longest.

In step 715, the central authority server 130 assigns a risk score for the phone number tenure for each of the plurality of phone numbers. For example, a phone number having a longer tenure can be assigned a lower risk score, whereas a phone number having a shorter tenure can be assigned a higher risk score. The higher the risk score, the more likely the phone number is a fraudulent phone number.

In step 720, the central authority server 130 may determine a device binding status for each of the plurality of phone numbers, based on the plurality of metadata. The device bind status of a phone number can indicate when the user last logged in on a device with that phone number, and/or how the user logged in, for example, by using a credit card or login credentials. The device bind status of a phone number can also indicate when the user first logged in on a device with that phone number.

In step 725, the central authority server 130 may assign a risk score for the device binding status for each of the plurality of phone numbers. A phone number having an earlier date binding status can be assigned a lower risk score, whereas a phone number having a later date binding status can be assigned a higher risk score. The higher the risk score, the more likely the phone number is a fraudulent phone number.

In step 730, the central authority server 130 may determine a phone number consistency for each of the plurality of phone numbers, based on the plurality of metadata. The phone number consistency can indicate the same phone number is shared by how many entities. The more entities that share the same phone number, the larger the phone number consistency of that phone number, and the more reliable that phone number.

In step 735, the central authority server 130 may assign a risk score for the phone number consistency for each of the plurality of phone numbers. A phone number having a higher consistency can be assigned a lower risk score, whereas a phone number having a lower consistency can be assigned a higher risk score. The higher the risk score, the more likely the phone number is a fraudulent phone number.

In step 740, the central authority server 130 can determine an average risk score for each of the plurality of phone numbers. As described above, in each category: the phone number tenure, the phone number consistency and the device binding status, a risk score is determined for each phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the binding status.

In step 745, the central authority server 130 may determine a most reliable phone number of the user from the plurality of phone numbers, based on the average risk score for each of the plurality of phone numbers. The phone number having the lowest average risk score would be determined to be the most reliable phone number. In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the plurality of participating entities.

FIG. 8 illustrates a flow chart of an example method 800 for reducing fraud for SMS OTP authentication according to an example embodiment FIG. 8 may reference the same or similar components as those illustrated in FIGS. 1-7, including a second entity device 120, a central authority server 130, a database 140, and a first entity device 110. The method 800 can be implemented in the system 100 and may include, but is not limited to the following steps.

In step 805, the central authority server 130 receives from a plurality of participating entities such as the first entity device 110 and the second entity device 120, a plurality of phone numbers and a plurality of metadata associated with a user. At least one of the plurality of phone numbers and at least one of the plurality of metadata are received from each of the plurality of participating entities. The at least one phone number may include one or more mobile phone number, such as a primary phone number and/or one or more secondary phone numbers. The metadata can include, but is not limited to, the last meaningful interaction between any or each of the plurality of participating entities and the user, the last interaction that resulted in successful authentication of the user by any or each of the plurality of participating entities, and/or an ignored text message received by the user from any or each of the plurality of participating entities.

In step 810, the central authority server 130 may determine, a phone number tenure for each of the plurality of phone numbers, based on the plurality of metadata. The phone number tenure can indicate how long that phone number has been in active use with the corresponding entity. A phone number that has a longest tenure can indicate that that phone number has been in active use the longest.

In step 815, the central authority server 130 may determine a phone number consistency for each of the plurality of phone numbers, based on the plurality of metadata. The phone number consistency can indicate the same phone number is shared by how many entities. The more entities that share the same phone number, the larger the phone number consistency of that phone number, and the more reliable that phone number.

In step 820, the central authority server 130 may conduct a real time phone ownership check for each of the plurality of phone numbers, based on the plurality of metadata. For example, when a phone number is about to be used, check with the phone company or other authority in real time to determine whether the owner of the phone number matches the owner of the phone number at the entities.

In step 825, the central authority server 130 may determine a most reliable phone number of the user from the plurality of phone numbers, based on the phone number tenure for each of the phone numbers, the phone number consistency for each of the phone numbers, and the real time phone ownership check for each of the plurality of phone numbers. The most reliable phone number may be determined based on an average risk score of each phone number. For example, in each category: the phone number tenure, the phone number consistency and the real time phone ownership check for each of the plurality of phone numbers, a risk score is determined for each phone number. A phone number having a longer tenure can be assigned a lower risk score, whereas a phone number having a shorter tenure can be assigned a higher risk score. The higher the risk score, the more likely the phone number is a fraudulent phone number. A phone number having a higher consistency can be assigned a lower risk score, whereas a phone number having a lower consistency can be assigned a higher risk score. The higher the risk score, the more likely the phone number is a fraudulent phone number. A phone number that the owner of the phone number matches the owner of the phone number at the entities can be assigned a lower risk score, whereas a phone number that the owner of the phone number does not match the owner of the phone number at the entities can be assigned a higher risk score. The higher the risk score, the more likely the phone number is a fraudulent phone number. An average risk score for each phone number can then be determined by a weighted average of the risk score in each category. For example, a largest weight may be assigned to the risk score of the phone number tenure, a middle weight may be assigned to the risk score of the phone number consistency, and a smallest weight may be assigned to the risk score of the real time phone ownership check. The phone number having the lowest average risk score would be determined to be the most reliable phone number.

In some embodiments, the average risk score of a phone number may be compared with an average risk score threshold. If the average risk score of that phone number is equal to or smaller than the average risk score threshold, then that phone number can be determined to be the most reliable phone number, otherwise, that phone number may not be determined to be the most reliable phone number even though that phone number has the smallest average risk score among the plurality of phone numbers received from the plurality of participating entities.

In some embodiments, instead of a risk score, a confidence score can be assigned to each category for each phone number. The higher the confidence score the more reliable the phone number. Similarly an average confidence score can be calculated for each phone number based on the confidence score in each category. The phone number having the highest average confidence score would be determined to be the most reliable phone number.

In step 830, the central authority server 130 transmits a SMS OTP message to the most reliable phone number. In step 835, the central authority server 130 may authenticate the user based on the SMS OTP, depending on a response to the SMS OTP from the user.

In some aspects, the techniques described herein relate to a method of reducing fraud for short message service (SMS) one-time password (OTP) authentication, including: receiving, by a server from a plurality of participating entities, a plurality of phone numbers and a plurality of metadata associated with a user, wherein at least one of the plurality of phone numbers and at least one of the plurality of metadata are received from each of the plurality of participating entities; determining, by the server, a phone number tenure for each of the plurality of phone numbers, based on the plurality of metadata; determining, by the server, a phone number consistency for the plurality of phone numbers, based on the plurality of metadata; determining, by the server, a device binding status for each of the plurality of phone numbers, based on the plurality of metadata; determining, by the server, a most reliable phone number associated with the user from the plurality of phone numbers based on the phone number tenure, the phone number consistency, and the device binding status; transmitting, by the server, to the most reliable phone number a SMS OTP; and authenticating the user based on the SMS OTP.

In some aspects, the techniques described herein relate to a method, wherein the most reliable phone number is a phone number shared by all of the plurality of participating entities.

In some aspects, the techniques described herein relate to a method, wherein the phone number tenure indicates how long a phone number has been in active use.

In some aspects, the techniques described herein relate to a method, wherein the most reliable phone number is a phone number that has a longest phone number tenure.

In some aspects, the techniques described herein relate to a method, wherein the phone number consistency indicates how many the plurality of participating entities have the same phone number.

In some aspects, the techniques described herein relate to a method, wherein the most reliable phone number is a phone number that has a highest phone number consistency.

In some aspects, the techniques described herein relate to a method, wherein the device binding status indicates when the user last logged in on a device with a known phone number.

In some aspects, the techniques described herein relate to a method, wherein the most reliable phone number is a phone number associated with a device on which the user last logged in most recently.

In some aspects, the techniques described herein relate to a system of reducing fraud for short message service (SMS)

one-time password (OTP) authentication, including a server, wherein the server include a processor and a memory coupled to the processor, and the server is configured to: receive, from plurality of participating entities, a plurality of phone numbers and a plurality of metadata associated with a user, wherein at least one of the plurality of phone numbers and at least one of the plurality of metadata are received from each of the plurality of participating entities; determine a phone number tenure for each of the plurality of phone numbers, based on the plurality of metadata; determine a phone number consistency for the plurality of phone numbers, based on the plurality of metadata; conduct a real time phone ownership check for one of the plurality of phone numbers; determine a most reliable phone number associated with the user from the plurality of phone numbers based on the phone number tenure, the phone number consistency, and the real time phone ownership check; transmit to the most reliable phone number a SMS OTP; and authenticate the user based on the SMS OTP.

In some aspects, the techniques described herein relate to a system, wherein the server is further configured to determine a device binding status for each of the plurality of phone numbers, based on the plurality of metadata.

In some aspects, the techniques described herein relate to a system, wherein the real time phone ownership check indicates that the server is to check with a phone company or other authorities in real time to determine whether the owner of that phone number matches the owner of the phone number at the plurality of participating entities.

In some aspects, the techniques described herein relate to a system, wherein the server is further configured to determine which one of the plurality of phone numbers is last successfully used by at least one of the plurality of participating entities to contact the user via a SMS contact.

In some aspects, the techniques described herein relate to a system, wherein the server is further configured to determine a last date for an ownership check by a third party for each of the plurality of phone numbers.

In some aspects, the techniques described herein relate to a system, wherein the server is further configured to determine the most reliable phone number based on the last date for the ownership check.

In some aspects, the techniques described herein relate to a system, wherein the most reliable phone number is a phone number that has been used for a most recent SMS OTP by one of the plurality of participating entities.

In some aspects, the techniques described herein relate to a system, wherein the server is further configured to authenticate the user through an email address of the user prior to transmitting the SMS OTP to the most reliable phone number.

In some aspects, the techniques described herein relate to a system, wherein the server is further configured to authenticate the user through a contactless card of the user prior to transmitting the SMS OTP to the most reliable phone number.

In some aspects, the techniques described herein relate to a system, wherein the server is further configured to rank the plurality of phone numbers in an order from a lowest risk score to a highest risk score, wherein the phone number having the lowest risk score is the most reliable phone number.

In some aspects, the techniques described herein relate to a non-transitory, computer-readable medium including instructions for reducing fraud for short message service (SMS) one-time password (OTP) authentication that, when executed on a computer arrangement, perform actions including: receiving, from a plurality of participating entities, a plurality of phone numbers and a plurality of metadata associated with a user, wherein at least one of the plurality of phone numbers and at least one of the plurality of metadata are received from each of the plurality of participating entities; determining a last date for an ownership check by a third party for each of the plurality of phone numbers; determining a phone number consistency for the plurality of phone numbers, based on the plurality of metadata; determining a device binding status for each of the plurality of phone numbers, based on the plurality of metadata; determining a most reliable phone number associated with the user from the plurality of phone numbers based on the phone number tenure, the phone number consistency, and the last date for an ownership check; transmitting to the most reliable phone number a SMS OTP; and authenticating the user based on the SMS OTP.

In some aspects, the techniques described herein relate to a non-transitory, computer-readable medium, wherein the actions further include determining a phone number tenure for each of the plurality of phone numbers, based on the plurality of metadata.

Throughout the disclosure, the term "entity" or "entities" are used, and it is understood that the present disclosure is not limited to a particular entity or type of entity. Rather, the present disclosure includes any type of entity, such as a person or a business, involved in activities where products or services are sold or otherwise provided or whether user authentication is performed.

Throughout the disclosure, the term "bank" is used, and it is understood that the present disclosure is not limited to a particular bank or type of bank. Rather, the present disclosure includes any type of bank or other business involved in activities where products or services are sold or otherwise provided or whether user authentication is performed.

Throughout the disclosure, the term "metadata" is used, and it is understood that the present disclosure is not limited to particular metadata or type of metadata. Rather, the present disclosure includes any type of data or user information as described herein.

In some examples, exemplary procedures in accordance with the present disclosure described herein can be performed by a processing arrangement and/or a computing arrangement (e.g., a computer hardware arrangement). Such processing and/or computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of a first device, a user device, a server, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, and any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing and/or processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing and/or processing device receives computer readable program instructions from the network and forwards the computer readable program instructions for storage in a computer readable storage medium within the respective computing and/or processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Throughout the disclosure, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fraud reduction method for short message service (SMS) one-time password (OTP) authentication, comprising:

receiving, by a server from a plurality of participating entities, a plurality of phone numbers and a plurality of metadata associated with a user, wherein at least one of the plurality of phone numbers and at least one of the plurality of metadata are received from each of the plurality of participating entities;

determining, by the server, a phone number tenure for each of the plurality of phone numbers, based on the plurality of metadata;

determining, by the server, a phone number consistency for each of the plurality of phone numbers, based on the plurality of metadata;

determining, by the server, a device binding status for each of the plurality of phone numbers, based on the plurality of metadata;

determining, by the server, a most reliable phone number associated with the user from the plurality of phone numbers based on the phone number tenure, the phone number consistency, and the device binding status;

transmitting, by the server, to the most reliable phone number a SMS OTP; and authenticating, by the server, the user based on the SMS OTP.

2. The method of claim 1, wherein the most reliable phone number is a phone number shared by all of the plurality of participating entities.

3. The method of claim 1, wherein the phone number tenure indicates how long a phone number has been in active use.

4. The method of claim 3, wherein the most reliable phone number is a phone number that has a longest phone number tenure.

5. The method of claim 1, wherein the phone number consistency indicates how many the plurality of participating entities have a same phone number.

6. The method of claim 5, wherein the most reliable phone number is a phone number that has a highest phone number consistency.

7. The method of claim 1, wherein the device binding status indicates when the user last logged in on a device with a known phone number.

8. The method of claim 7, wherein the most reliable phone number is a phone number associated with a device on which the user last logged in most recently.

9. A fraud reduction system for short message service (SMS) one-time password (OTP) authentication, comprising:

a server comprising a processor and a memory coupled to the processor, wherein the server is configured to:

receive, from plurality of participating entities, a plurality of phone numbers and a plurality of metadata associated with a user, wherein at least one of the plurality of phone numbers and at least one of the plurality of metadata are received from each of the plurality of participating entities;

determine a phone number tenure for each of the plurality of phone numbers, based on the plurality of metadata;

determine a phone number consistency for each of the plurality of phone numbers, based on the plurality of metadata;

conduct a real time phone ownership check for one of the plurality of phone numbers;

determine a most reliable phone number associated with the user from the plurality of phone numbers based on the phone number tenure, the phone number consistency, and the real time phone ownership check;

transmit to the most reliable phone number a SMS OTP; and authenticate the user based on the SMS OTP.

10. The system of claim 9, wherein the server is further configured to determine a device binding status for each of the plurality of phone numbers, based on the plurality of metadata.

11. The system of claim 9, wherein the real time phone ownership check indicates that the server is to check with a phone company or other authorities in real time to determine whether an owner of that phone number matches the owner of the phone number at the plurality of participating entities.

12. The system of claim 9, wherein the server is further configured to determine which one of the plurality of phone numbers is last successfully used by at least one of the plurality of participating entities to contact the user via a SMS contact.

13. The system of claim 9, wherein the server is further configured to determine a last date for an ownership check by a third party for each of the plurality of phone numbers.

14. The system of claim 13, wherein the server is further configured to determine the most reliable phone number based on the last date for the ownership check.

15. The system of claim 9, wherein the most reliable phone number is a phone number that has been used for a most recent SMS OTP by one of the plurality of participating entities.

16. The system of claim 9, wherein the server is further configured to authenticate the user through an email address of the user prior to transmitting the SMS OTP to the most reliable phone number.

17. The system of claim 9, wherein the server is further configured to authenticate the user through a contactless card of the user prior to transmitting the SMS OTP to the most reliable phone number.

18. The system of claim 9, wherein the server is further configured to rank the plurality of phone numbers in an order from a lowest risk score to a highest risk score, wherein the phone number having the lowest risk score is the most reliable phone number.

19. A non-transitory, computer-readable medium comprising instructions for reducing fraud for short message service (SMS) one-time password (OTP) authentication that, when executed on a computer arrangement, perform actions comprising:

receiving, from a plurality of participating entities, a plurality of phone numbers and a plurality of metadata associated with a user, wherein at least one of the plurality of phone numbers and at least one of the plurality of metadata are received from each of the plurality of participating entities;

determining a last date for an ownership check by a third party for each of the plurality of phone numbers;

determining a phone number consistency for each of the plurality of phone numbers, based on the plurality of metadata;

determining a device binding status for each of the plurality of phone numbers, based on the plurality of metadata;

determining a most reliable phone number associated with the user from the plurality of phone numbers based on phone number tenure, phone number consistency, and the last date for an ownership check;

transmitting to the most reliable phone number a SMS OTP; and authenticating the user based on the SMS OTP.

20. The non-transitory, computer-readable medium of claim 19, wherein the actions further comprise determining a phone number tenure for each of the plurality of phone numbers, based on the plurality of metadata.

* * * * *